(12) United States Patent
Gekht et al.

(10) Patent No.: US 7,100,358 B2
(45) Date of Patent: Sep. 5, 2006

(54) TURBINE EXHAUST CASE AND METHOD OF MAKING

(75) Inventors: Eugene Gekht, Brossard (CA); Mike Fontaine, Candiac (CA); Martin Jutras, St. Amable (CA)

(73) Assignee: Pratt & Whitney Canada Corp., Longueuil (CA)

( * ) Notice: Subject to any disclaimer, the term of this patent is extended or adjusted under 35 U.S.C. 154(b) by 17 days.

(21) Appl. No.: 10/892,497

(22) Filed: Jul. 16, 2004

(65) Prior Publication Data

US 2006/0010852 A1    Jan. 19, 2006

(51) Int. Cl.
  F02C 7/08    (2006.01)
  F02G 1/00    (2006.01)
  F02G 3/00    (2006.01)

(52) U.S. Cl. .................... 60/39.5; 60/770; 415/211.2; 415/142

(58) Field of Classification Search ................ 60/39.5, 60/262, 226.1, 263, 770; 415/211.2, 142
See application file for complete search history.

(56) References Cited

U.S. PATENT DOCUMENTS

| | | | |
|---|---|---|---|
| 2,844,001 A | 7/1958 | Alford | 60/35.6 |
| 2,941,781 A * | 6/1960 | Boyum | 415/142 |
| 3,156,437 A | 11/1964 | Mercier | 244/73 |
| 3,403,889 A * | 10/1968 | Ciokajlo | 415/220 |
| 3,909,156 A | 9/1975 | Stahl | |
| 4,023,350 A | 5/1977 | Hovan et al. | 60/39.5 |
| 4,117,671 A | 10/1978 | Neal et al. | 60/262 |
| 4,478,551 A | 10/1984 | Honeycutt, Jr. et al. | 415/142 |
| 4,492,078 A * | 1/1985 | Williamson | 60/797 |
| 4,492,518 A * | 1/1985 | Neal | 415/142 |
| 4,644,129 A | 2/1987 | Miller | |
| 4,802,821 A | 2/1989 | Krietmeier | 415/210 |
| 4,820,117 A * | 4/1989 | Larrabee et al. | 415/142 |
| 4,859,143 A * | 8/1989 | Larrabee et al. | 415/142 |
| 4,920,742 A * | 5/1990 | Nash et al. | 60/799 |
| 4,979,872 A * | 12/1990 | Myers et al. | 415/142 |
| 4,989,406 A | 2/1991 | Vdoviak et al. | |
| 4,993,918 A * | 2/1991 | Myers et al. | 415/191 |
| 5,076,049 A * | 12/1991 | Von Benken et al. | 60/797 |
| 5,088,279 A * | 2/1992 | MacGee | 60/226.1 |
| 5,102,298 A | 4/1992 | Kreitmeier | 415/211.2 |
| 5,184,459 A * | 2/1993 | McAndrews | 60/226.3 |
| 5,236,303 A * | 8/1993 | Fowler et al. | 415/190 |
| 5,292,227 A * | 3/1994 | Czachor et al. | 415/209.3 |
| 5,338,155 A | 8/1994 | Kreitmeier | 415/211.2 |
| 5,346,365 A | 9/1994 | Matyscak | 415/213.1 |
| 5,362,204 A | 11/1994 | Matyscak et al. | 415/213.1 |
| 5,634,767 A * | 6/1997 | Dawson | 415/134 |
| 5,791,136 A | 8/1998 | Utamura et al. | 60/39.182 |
| 5,878,940 A | 3/1999 | Rosenbalm | |
| 5,943,856 A | 8/1999 | Lillibridge et al. | 60/262 |
| 6,099,165 A * | 8/2000 | Tremaine | 384/99 |

(Continued)

FOREIGN PATENT DOCUMENTS

GB    685939    1/1953

(Continued)

*Primary Examiner*—William H. Rodriguez
(74) *Attorney, Agent, or Firm*—Ogilvy Renault LLP

(57) ABSTRACT

A structural turbine exhaust case of a gas turbine engine, comprises inner and outer case portions; a bearing housing connected to the inner case portion for supporting a main spool of the gas turbine engine; and a plurality of airfoils extending between the inner and outer case portions, airfoils structurally connecting the inner case portion to the outer case portion.

7 Claims, 5 Drawing Sheets

U.S. PATENT DOCUMENTS

| | | | |
|---|---|---|---|
| 6,439,841 B1 * | 8/2002 | Bosel | 415/142 |
| 6,739,120 B1 * | 5/2004 | Moniz et al. | 60/226.1 |
| 6,792,758 B1 * | 9/2004 | Dowman | 60/772 |
| 2005/0022501 A1 * | 2/2005 | Eleftheriou et al. | 60/226.1 |
| 2005/0109013 A1 * | 5/2005 | Eleftheriou et al. | 60/226.1 |
| 2005/0241290 A1 * | 11/2005 | Lapergue et al. | 60/226.1 |

FOREIGN PATENT DOCUMENTS

| | | |
|---|---|---|
| GB | 702760 | 1/1954 |
| GB | 852826 | 11/1960 |
| GB | 856670 | 12/1960 |
| GB | 866555 | 4/1961 |
| GB | 1296378 | 11/1972 |
| JP | 0324699 A | 12/1997 |

* cited by examiner

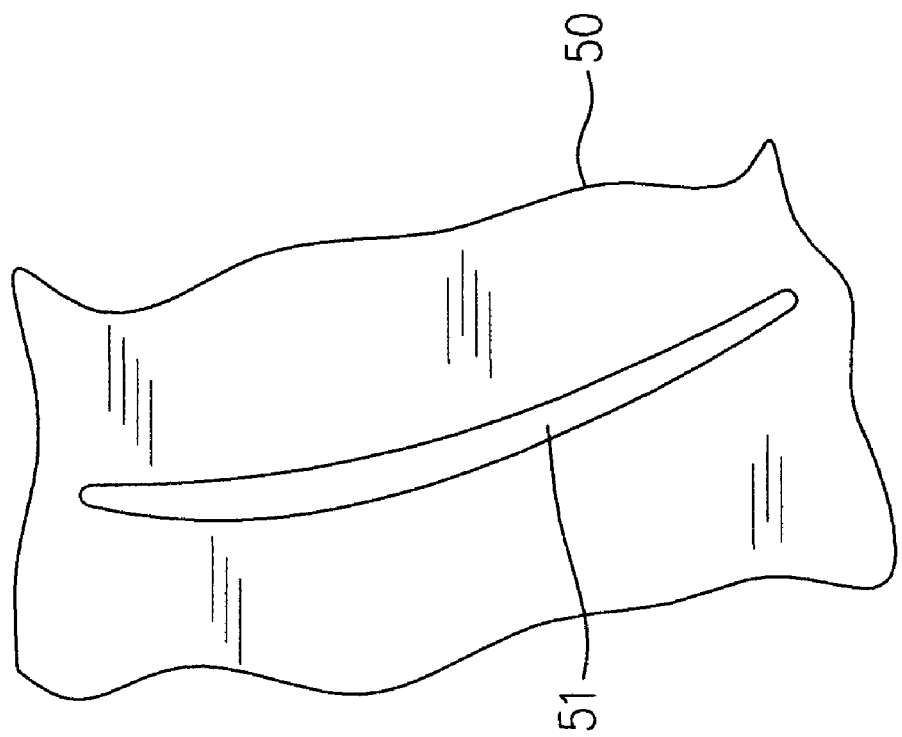
FIG. 5
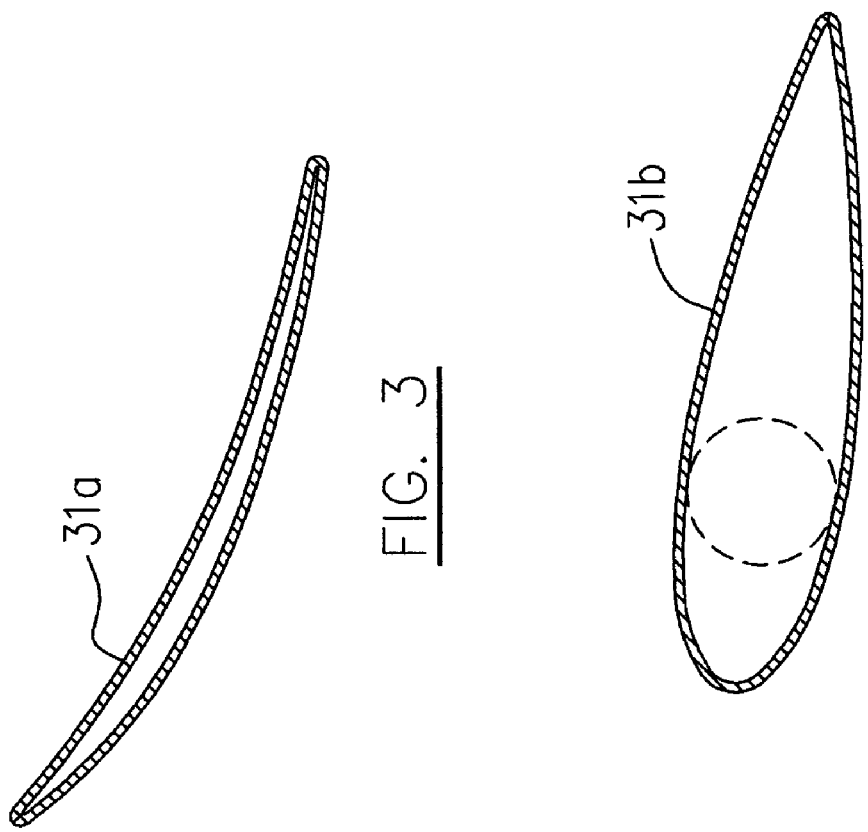
FIG. 3
FIG. 4

TURBINE EXHAUST CASE AND METHOD OF MAKING

FIELD OF THE INVENTION

The present invention relates to gas turbine engines, and more particularly to a turbine exhaust case of an gas turbine engine.

BACKGROUND OF THE INVENTION

A "non-structural" turbine exhaust case typically used for gas turbines and is basically little more than an aerodynamic fairing, and carries no additional load other than its own weight and any aerodynamic loading effecting thereon. A "structural" turbine exhaust case on the other hand not only supports its own weight and any aerodynamic loading, but also supports a bearing housing and bearing for a main spool of the engine, typically, the low pressure spool. Present state of the art structural turbine exhaust cases, and in particular the bearing housing and the airfoils components, are made of cast components. However, cast components used in smaller airborne gas turbine engines (e.g. about 2000 lbs thrust and under) will increase the weight and thereby cost of manufacturing. Thus it would be desirable to provide a configuration with the strength-to-weight ratio.

SUMMARY OF THE INVENTION

One object of the present invention is to provide a improved structural turbine exhaust case.

In accordance with one aspect of the present invention, there is a turbine exhaust case of a gas turbine engine which comprises inner and outer case portions defining an annual gas path therebetween, the inner case portion including a bearing housing portion adapted to support a main spool bearing of the gas turbine engine, the outer case including a connection apparatus for supportably connecting the turbine exhaust case to the gas turbine engine and a plurality of sheet metal airfoils extending between the inner and outer case portions, the sheet metal airfoils structurally connecting the inner case portion to the outer case portion and supporting inner case relative to outer case.

In accordance with another aspect of the present invention, there is a turbine exhaust case of a gas turbine engine, which comprises inner and outer case portions, a bearing housing connected to and supported by the inner case portion for supporting a main spool of the gas turbine engine, a plurality of airfoils extending between the inner and outer case portions, the airfoils structurally connecting and supporting the inner case portion to the outer case portion and wherein the inner case portions are sheet metal.

In accordance with a further aspect of the present invention, there is a method provided for welding an end of a sheet metal airfoil to an annular case of a gas turbine engine, which comprises inserting the end of the airfoil into a matingly-profiled opening of the case wall and applying a weld fillet extending along an periphery of the profiled opening and fully penetrating through an entire thickness of the case wall, wherein the case wall thickness is adapted to permit said full penetration.

In accordance with a still further aspect of the present invention, there is a method provided for fabricating a turbine exhaust case of a gas turbine engine, which comprises providing inner and outer case portions with profiled openings therein, providing a bearing housing for supporting a main spool of the gas turbine engine, providing a plurality of sheet metal airfoils, and brazing the bearing housing to the inner case portion and welding the respective airfoils at opposed ends thereof to the respective inner and outer case portions, thereby structurally connecting the inner and outer case portions to bear a load of the main spool of the engine supported by the bearing housing.

In accordance with a yet further aspect of the present invention, there is a method for welding a profiled sheet metal element to a metal host having a matingly profiled opening therethrough, which comprises the step of inserting an end profiled sheet metal element into the matingly-profiled opening from a first face side of the host such that a portion of the element protrudes through the opening and extends a height above a second face side of the host and applying a weld fillet from the second face side along a periphery of the opening, wherein the protrusion height is selected so that the protruding portion is substantially consumed during the step of applying a fillet weld.

The present invention advantageously provides a structural turbine exhaust case which is lighter in weight and more reliable in operation, resulting from improved welding quality of the airfoils connected to the inner and outer case portions.

Other advantages and features of the present invention will be better understood with reference to a preferred embodiment described hereinafter.

BRIEF DESCRIPTION OF THE DRAWINGS

Reference will now be made to the accompanying drawings by way of illustration showing a preferred embodiment of the present invention in which:

FIG. 2A is a perspective view of a structural turbine exhaust case incorporating one embodiment of the present invention and used in the engine of FIG. 1, while

FIG. 3 is a cross-sectional view of a sheet metal airfoil of the embodiment of FIG. 2A;

FIG. 4 is a cross-sectional view of a sheet metal strut of the embodiment of FIG. 2A;

FIG. 5 is a partial top plan view of an outer case portion of the embodiment of FIG. 2A, showing a profiled opening therein for receiving an outer end of the airfoil before welding;

It will be noted that throughout the appended drawings, like features are identified by like reference numerals.

DETAILED DESCRIPTION OF THE PREFERRED EMBODIMENT

Figure 1:
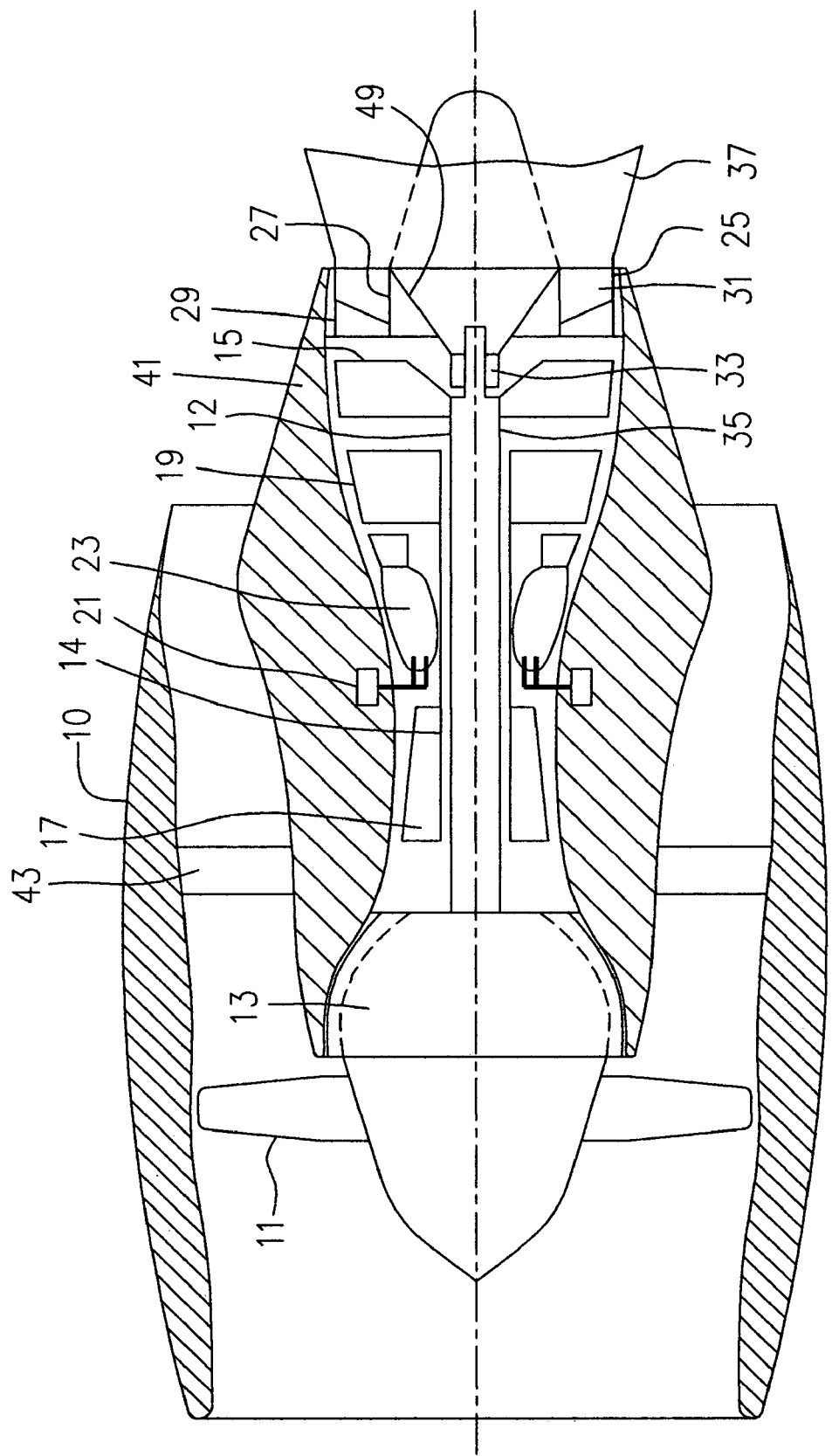
FIG. 1 is a cross-sectional view of a bypass gas turbine engine, as an exemplary application of the present invention.

A bypass gas turbine engine seen generally in FIG. 1 includes a housing or nacelle 10, a low pressure spool assembly seen generally at 12 which includes a fan 11, low pressure compressor 13 and low pressure turbine 15, a high pressure spool assembly seen generally at 14 which includes a high pressure compressor 17, high pressure turbine 19, a burner seen generally at 23 and fuel injecting means 21.

Figure 2A:
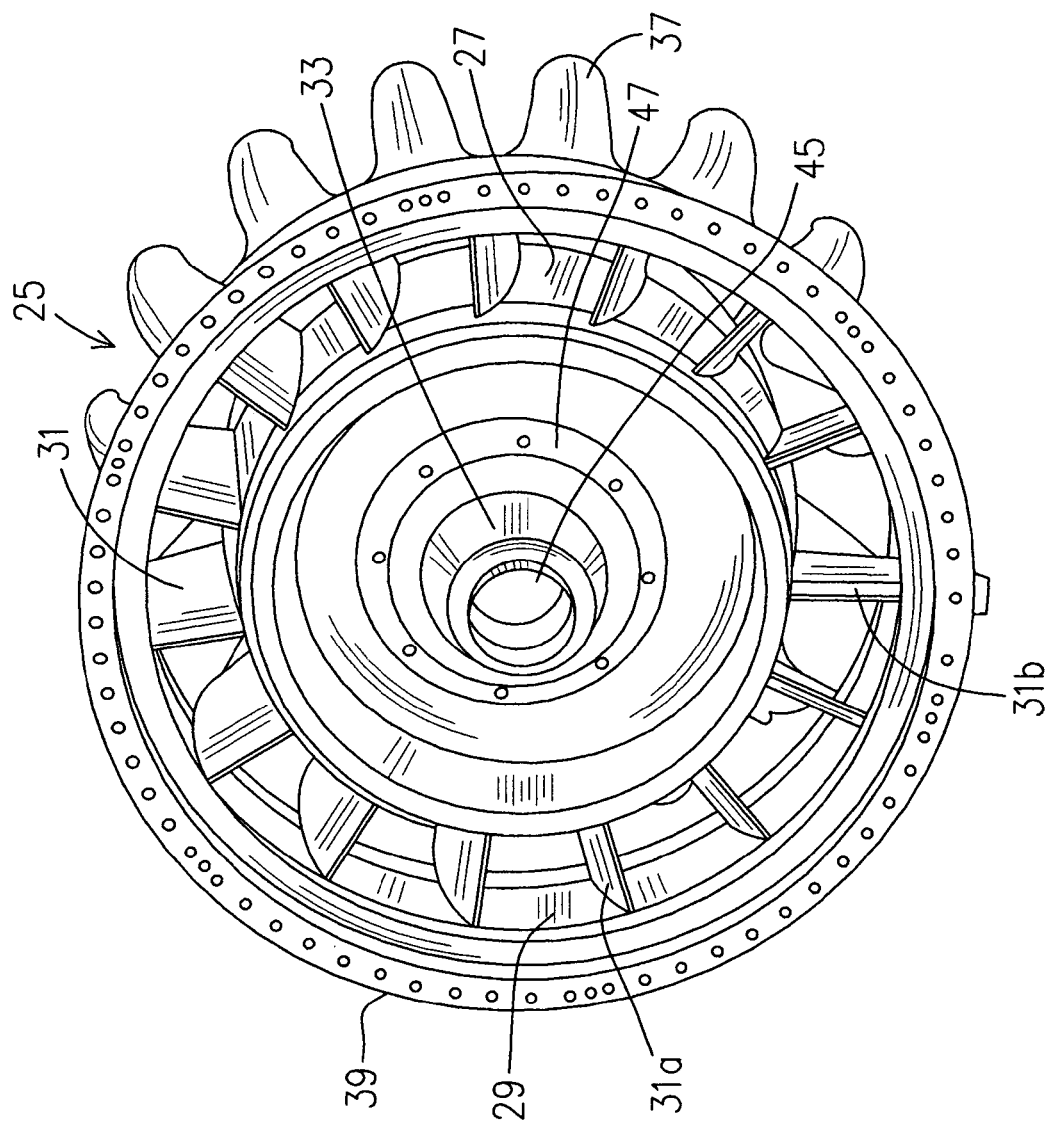
Figure 2B:
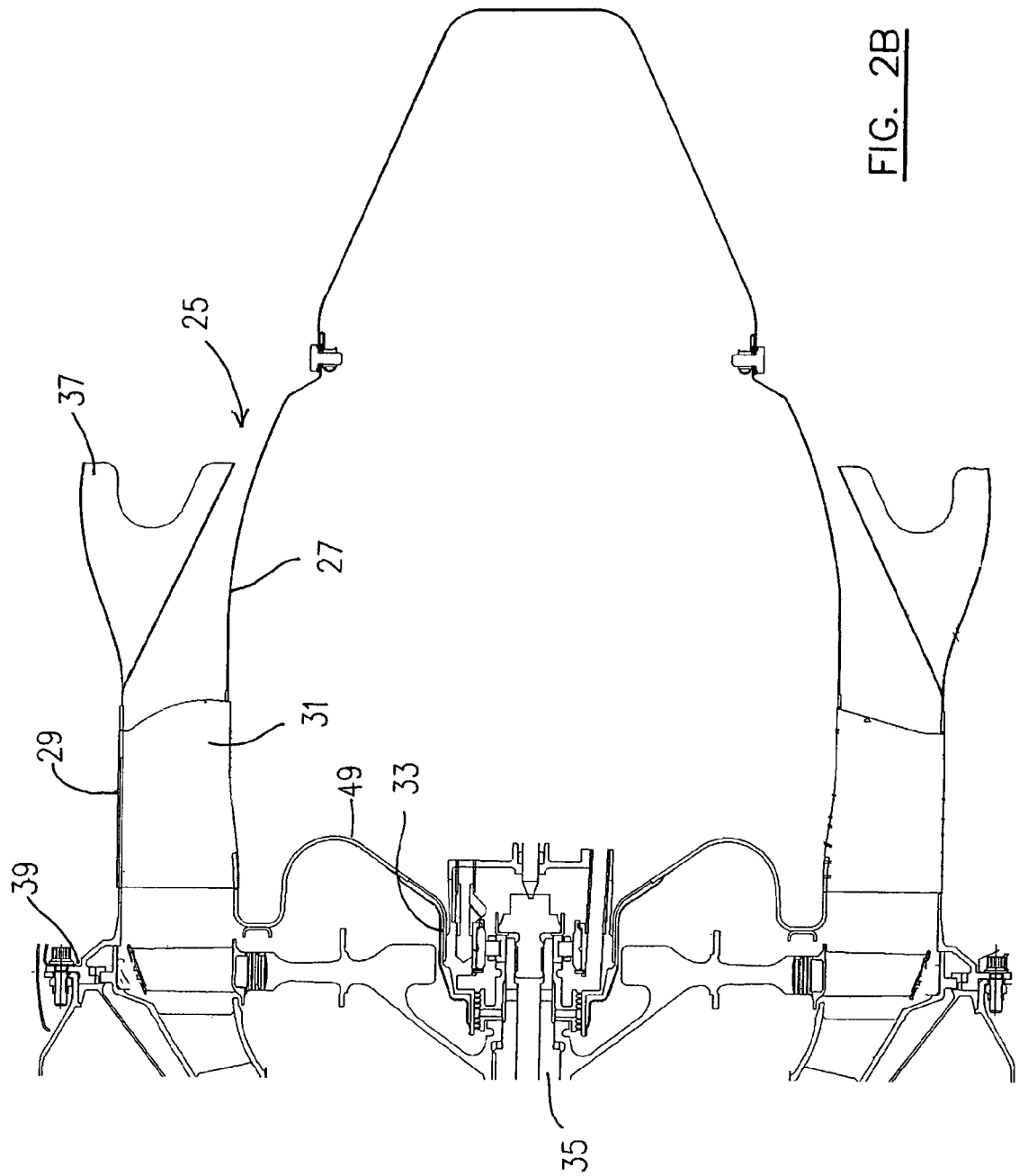
FIG. 2B is a cross-section of the same installed on the engine.
Figure 8:
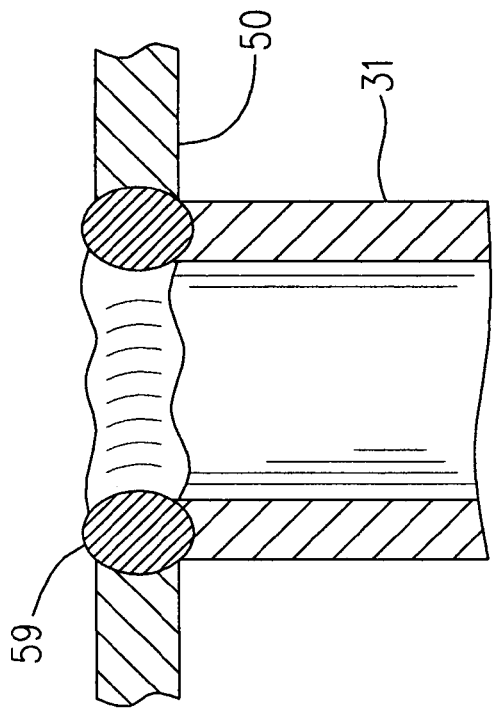
FIG. 8 is a view similar to FIG. 7, showing a welded configuration of the airfoil connected to the case wall according to the welding method of the present invention.

Referring to FIGS. 1 and 2A–2B, the bypass gas turbine engine further includes a turbine exhaust case 25 which as an example of the present invention, includes an annular inner case portion 27 and an annular outer case portion 29 and a plurality of airfoils 31 circumferentially spaced apart, and radially extending between the inner and outer case portions 27, 29, thereby structurally connecting same. A bearing housing 33 is co-axially connected to the inner case portion 27 for supporting an aft end of a main shaft 35 of the low pressure spool 12. Preferably, there is a mixer 37 attached to the aft end of the outer case portion 29. A mounting flange 39 is integrated with the outer case portion 29 at the front end thereof for securing the turbine exhaust case 25 to the engine case 41 which in turn is structurally connected to the nacelle 10 through a plurality of radially extending struts 43.

In operation, combustion gases discharged from the burner 23 power the high and low pressure turbines 19 and 15, and then exhausted into the annular gas path defined between the inner and outer case portions 27, 29. The tangential components included in the exhaust gases is deswirled by the airfoils 31 of the turbine exhaust case 25, and then the exhaust gases are discharged into the atmosphere through the mixer 17 which facilitates the mixing of the exhaust gases with the bypass air flow. The bypass gas turbine engine is supported by aircraft frame, for example suspending from the wings by a mounting structure connected to the nacelle 10. Therefore, the turbine exhaust case 25 is part of the mechanical support chain for supporting the weight of the entire engine. In particular, the turbine exhaust case 25 supports a major portion of the weight of the low pressure spool 12, in addition to bearing its own weight and the aerodynamic loads affecting thereon by the exhaust gases.

In accordance with one embodiment of the present invention, at least the airfoils 31 of the turbine exhaust case 25 are made of sheet metal, preferably all components of the turbine exhaust case 25 are made from fabricating processes different from a casting process thereby avoiding porosity defects formed therein. In other words, the turbine exhaust case 25 includes no casting components; for example, sheet metal airfoils, sheet metal inner and outer case portions and machined bearing housing 33 made of a forged component. The mixer 37 is also preferably made of sheet metal fabricated in a pressing process.

The bearing housing 33 includes a cylindrical body (not indicated) defining a bore 45 machined in an accurate size for accommodating a bearing of the main shaft 35 of the low pressure spool 12. The bearing housing 33 further includes a flange portion 47 radially and upwardly extending from the cylindrical body at the aft end thereof. The flange portion 47 of the bearing housing 33 is connected by a plurality of bolts (not indicated), or alternatively by welding, to an inner support structure of the inner case portion 27 of the turbine exhaust case 25. The inner support structure of the inner case portion 27 includes a truncated conical structure 49 (more clearly seen in FIG. 2B) extending inwardly, radially and forwardly from the forward end of the inner case portion 27, to connect the bearing housing 33. The truncated conical structure 49 is also made of sheet metal which can be integrated with the inner case portion 27, or welded to the inner case portion 27 at their adjoining aft ends. As can be seen in FIG. 2B, the cross sectional profile of structure 49 is somewhat like a hair pin which, as the skilled reader will understand in light of this disclosure, gives the sheet metal structure 49 the desired stiffness to permit adequate structural support for bearing housing 33. The smooth, profiled bends of inner case portion 27, from gas path to bearing chamber, provide the configuration desired to permit a sheet metal construction to reliably support the bearing and spool components.

Referring to FIGS. 2A–2B to 4. the airfoils 31 are made of sheet metal bent in a forming process thereby form a hollow airfoil configuration 31a or 31b as shown in respective FIGS. 3 and 4. The opposed ends of the bent sheet metal(s) are joined by a line of welding fillet (not indicated). The welding line is preferably positioned at either a leading edge or a trailing edge of the airfoil. Alternatively, each of the airfoils 31a and 31b can be made of two pieces of sheet metal spaced apart to form the hollow configuration. The two spaced pieces of sheet metal join together at the leading edge and trailing edge of the airfoil in a welding process. The hollow airfoil configuration 31b presents a thicker profiled cross-section, providing a relatively big space to allow services and pipes (shown in a circular broken line) to pass through. One airfoil configured with the thicker configuration 31b is provided in the turbine exhaust case 25 (see FIG. 2) for permitting oil pipes (not shown) to pass through for delivering oil to the bearing housing 33. The remaining airfoils provide only aerodynamic functions and their inner space is not used, therefore is configured with a thinner configuration 31a as shown in FIG. 3, to present a relatively thin cross-sectional profile.

Each of the airfoils 31 is welded at opposed ends thereof to the respective inner and outer case portions 27, 29 to form the complete structure of the turbine exhaust case 25. The sheet metal mixer 37 is connected by bolts fastening the adjoining flanges (not shown) of the respective turbine exhaust case 25 and the mixer 37. However, the mixer 37 can be alternatively welded at the front end thereof to the aft end of the outer case portion 29 of the turbine exhaust case 25. In a turbine exhaust case fabrication process, the components thereof can be connected in any desired sequence, and are not limited by the above described order Referring to FIGS. 3–8, a method of improved welding process in accordance with another aspect of the present invention is described, particularly for welding the airfoils 31 to a case wall 50 of the respective inner and outer case portions 27, 29 of FIG. 1. During the fabrication, the case wall 50 of the respective inner and outer case portions 27, 29 of FIG. 1 is provided with a plurality of profiled openings 51 (only one shown in FIG. 5) in locations where the airfoil 31 is to be connected. This can be conducted by any well known means. The profiled opening 51 corresponds to the profiled cross section of an end of a corresponding airfoil 31 to be welded to the case wall 50 such that the airfoil 31 can be inserted from one side of the case wall 50 into the profiled opening 51 and fitly received therein with a protruding end section H1 or H2 extending out of the case wall 50 at the other side thereof.

Figure 6:
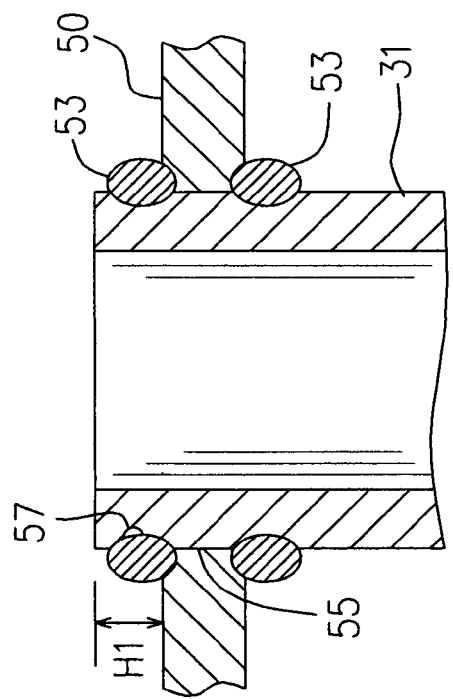
FIG. 6 is a schematic cross-sectional view of an airfoil conventionally welded at an end thereof to a case wall.
Figure 7:
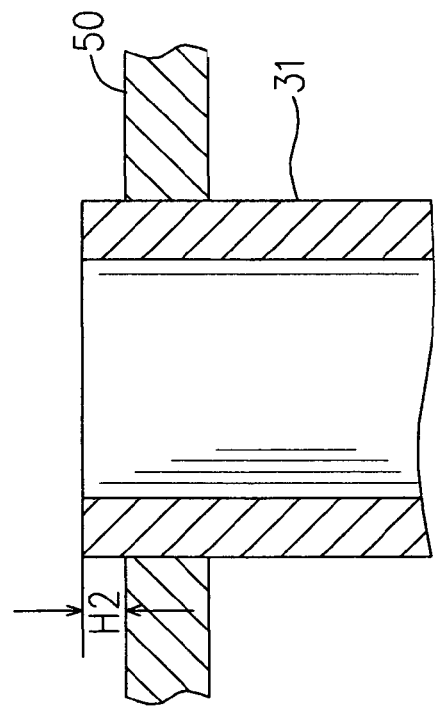
FIG. 7 is a schematic cross-sectional view of an end of an airfoil inserted into a profiled opening of a case wall before welding according to the welding method of the present invention.

Conventionally, a welding fillet line 53 is formed at each side of the case wall 50, surrounding the sectional profile of the airfoil 31, securing the airfoil 31 to the case wall 50, as shown in FIG. 6. The reason for welding the airfoil 31 at both sides of the case wall 50 is that the welding fillet line 53 only partially penetrates the case wall 50. Nevertheless, although welding fillet lines 53 are provided at both sides of the case wall 50, which will improve the quality of the connection of the airfoil 31 to the case wall 50, there is still a possibility to leave an unwelded portion 55 of the interface between the welding fillet lines 53 at both sides of the case wall 50. This unwelded portion 55 of the interface functions as a crack in a component of the gas turbine engine and thereby creates potential dangers to the safety of the engine operation. When the airfoil is conventionally made of a cast component, the airfoil may contain fine holes in the body thereof resulting from fine bubbles in a casting process. When a fine hole, as indicated at numeral 57 is located adjacent to the welding fillet line 53, it creates another crack which is a unwelded portion between welding fillet line 53 and the cast airfoil 31.

Another disadvantage of the conventional method of welding airfoil 31 to case wall 50 of the respective inner and outer case portions 27, 29 of FIG. 1 lies in that it is difficult to access the welding location inside the annular exhaust past defined between the inner and outer case portions 27, 29 of FIG. 1, particularly with welding tools. In certain circumstances, such inside welding has to be given up because of no access to the desired location. This will more likely happen in manufacturing of small gas turbine engines, and is apparently not desirable.

In accordance the present invention, the welding process is conducted only at one side of the case wall 50 out of which side of the case wall the airfoil end to be welded extends, the is, an outer side opposite to the inner side defining the annular exhaust gas path. The end of the airfoil 31 should be inserted into the opening 51 of the case wall 50 with a protruding portion H2 which is predetermined such that the protruding portion H2 of the end of airfoil 31 will be substantially consumed in weld and will not appear after the welding process.

The welding process begins with applying to the end of the airfoil 31 either a laser beam or an electron beam at the side of the case wall 50 having the protruding portion H2 of the end of the airfoil 31. The laser beam or electro-beam is adjusted to have a controlled size, resulting in the fillet 59 extending along a periphery of the profiled opening 51 of the case wall 50 and penetrating through an entire thickness of the case wall 50. Preferably, the laser beam or electron beam is further adjusted to have a controlled size such that the welding fillet 59 also penetrates through the entire thickness of the sheet metal of the airfoil 31. Therefore, the welding fillet 59 constitutes an integral and complete joining portion of the end of the airfoil 31 and the case wall 50, which eliminates any possible unwelded portions of the interface, thereby avoiding any possible cracks in the welding area. The welding process is preferably conducted with an automatic welding apparatus.

The welding method of the present invention advantageously avoids welding the airfoils to the case wall of the respective inner and outer case portions of FIG. 1 from the inside of the annular exhaust gas path defined between the inner and outer case portions. Therefore, it is convenient and efficient to conduct a welding process for manufacturing the turbine exhaust case, thereby saving the manufacturing cost. The turbine exhaust case manufactured using the welding method of the present invention provides more safety and reliability for engine operation.

It should be noted that although the welding method of the present invention is described with reference to a fabricating process of welding an airfoil to the respective inner and outer case portions of the turbine exhaust case, it is applicable to use the method of the present invention for welding any other components, particularly of a gas turbine engine. For example, the bearing housing 33 which may be made of sheet metal, machined forging components or other metal components, can be welded to the inner support structure of the inner case portion 27 in accordance with the present invention.

Modifications and improvements to the above-described embodiments of the present invention may become apparent to those skilled in the art. The foregoing description is intended to be exemplary rather than limiting. The scope of the invention is therefore intended to be limited solely by the scope of the appended claims.

We claim:

1. A turbine exhaust case of a gas turbine engine, comprising:
   inner and outer case portions defining an annual gas path therebetween, the inner case portion including a bearing housing portion adapted to support a main spool bearing of the gas turbine engine, the outer case including a connection apparatus for supportably connecting the turbine exhaust case to the gas turbine engine; and
   a plurality of sheet metal airfoils extending between the inner and outer case portions, the sheet metal airfoils structurally connecting the inner case portion to the outer case portion and supporting inner case relative to outer case.

2. The turbine exhaust case as claimed in claim 1 further comprising an exhaust gas mixer connected to an aft end of the outer case portion.

3. The turbine exhaust case as claimed in claim 1 wherein the inner and outer case portions are sheet metal.

4. The turbine exhaust case as claimed in claim 1 wherein the bearing housing is forged.

5. A turbine exhaust case of a gas turbine engine, comprising:
   inner and outer case portions;
   a bearing housing connected to and supported by the inner case portion for supporting a main spool of the gas turbine engine;
   a plurality of airfoils extending between the inner and outer case portions, the airfoils structurally connecting and supporting the inner case portion to the outer case portion; and
   wherein the inner case portions are sheet metal.

6. The turbine exhaust case as claimed in claim 5 wherein the inner and outer case portions, bearing housing and airfoils are welded together, a weld fillet encircling a profile of a welded end of each of the airfoils and penetrating through an entire thickness of a wall of the respective inner and outer case portions.

7. The turbine exhaust case as claimed in claim 5 wherein the inner case comprises at least one smooth sheet metal bend portion in an axial cross-section, adapted to stiffen the inner case portion.

* * * * *